May 24, 1966 H. V. KELTON 3,252,561
FEEDER DEVICE

Filed Aug. 16, 1963 3 Sheets-Sheet 1

INVENTOR.
Harold V. Kelton
BY
Newton, Hopkins & Jones
ATTORNEYS

May 24, 1966 H. V. KELTON 3,252,561
FEEDER DEVICE
Filed Aug. 16, 1963 3 Sheets-Sheet 2
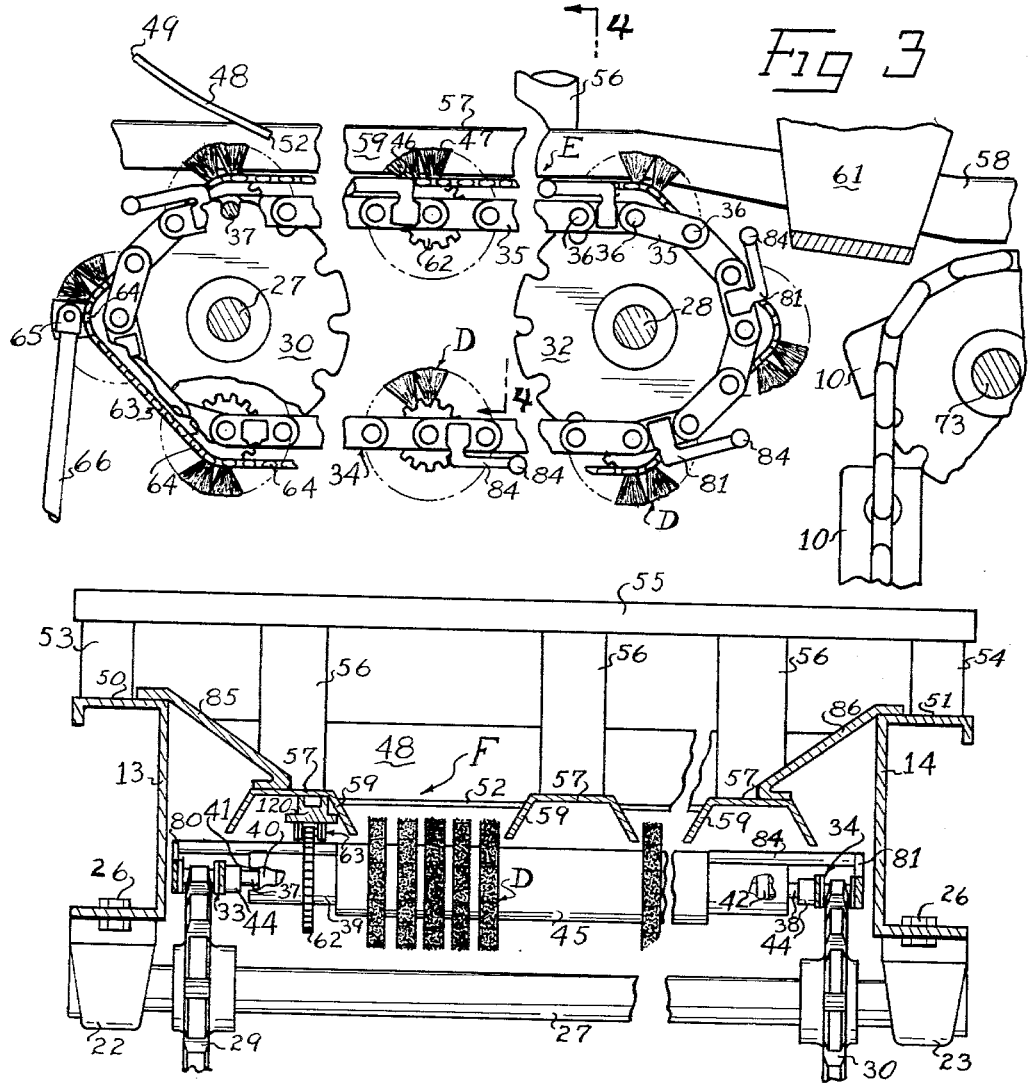
INVENTOR.
Harold V. Kelton
BY
Newton, Hopkins & Jones
ATTORNEYS

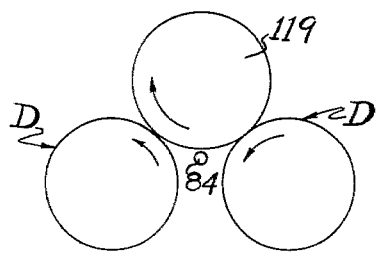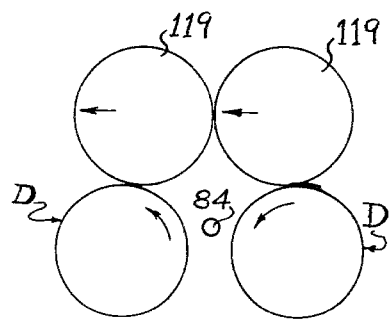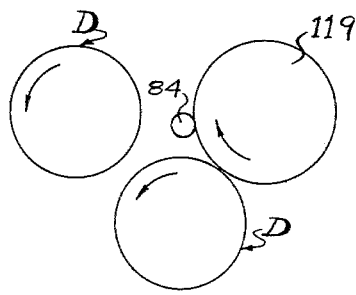

United States Patent Office 3,252,561
Patented May 24, 1966

3,252,561
FEEDER DEVICE
Harold V. Kelton, Manchester, Ga., assignor to Durand Machinery, Inc., Woodbury, Ga., a corporation of Georgia
Filed Aug. 16, 1963, Ser. No. 302,558
13 Claims. (Cl. 198—30)

This invention relates to devices for mechanically arranging articles and more particularly, to a feeder device for arranging fruit and feeding it in an orderly and controlled manner to another device or to a work station for packaging, weighing by a weight sizer of known type, or for other fruit processing operations.

In the processing and handling of fruit and other similar articles, there is a frequent requirement for randomly arranged articles or pieces of fruit to be arranged and fed in an orderly and controlled manner to work stations or pieces of apparatus for further processing. Typical of such a requirement is the requirement that fruit be arranged and fed in an orderly and controlled manner to a weight sizer. This requirement exists because weight sizers customarily sort or size fruit by responding in known manner to fruit positioned in a plurality of cups carried by an endless conveyor belt or similar arrangement and because proper utilization of a weight sizer requires that one piece of fruit be placed in each cup as it passes a predetermined point. If a piece of fruit is not placed in some of the cups as they pass the predetermined point, the weight sizer is not operating at maximum capacity and if more than one piece of fruit is placed in some of the cups, the weight sizer will not function properly.

The arranging and feeding of fruit to a weight sizer is difficult and laborious to accomplish by hand. Accordingly, a number of feeder devices have been previously developed to arrange randomly arranged fruit and feed it in an orderly manner to apparatus such as a weight sizer. These previous feeder devices have not been wholly satisfactory because pieces of fruit generally enter a feeder device at a varying input rate and because previous feeder devices have been unable to adequately adjust to changes in the input rate of the fruit.

These previous feeder devices have been constructed to arrange and feed fruit on the basis of an average input rate and when the input rate is below average, the output from these previous feeder devices is also below average with the result that the weight sizer is not fully utilized. When the input rate to these previous feeder devices is above average, these previous feeder devices have customarily avoided overloading a weight sizer with excessive output by arrangements which simply remove the excess fruit from the feeder device. These arrangements for removing excess fruit have frequently damaged the fruit and almost always require that the excess fruit be manually returned to the feeder device.

The feeder device disclosed herein substantially eliminates these and other difficulties with previous feeder devices used to arrange randomly arranged fruit and feed it in an orderly and controlled manner to a weight sizer of known type. The feeder device of the invention has a plurality of brushes moving from its input end to its output end. A pocket is formed between adjoining brushes and a piece of fruit placed in one of the plurality of pockets formed between adjoining brushes will move with the brushes from the input end to the output end of the feeder device.

As the plurality of brushes move from the input end to the output end of the feeder device they rotate in that direction and at that speed which causes the brush surface upon which the fruit is resting to move in a direction opposite to the direction of linear motion of the brushes and fruit and at a speed greater than the speed of linear motion. The result is that a single piece of fruit in one of the plurality of pockets formed between adjoining brushes rotates with the brushes at the speed of brush rotation as the fruit moves from the input end to the output end of the feeder device.

However, the presence of more than one piece of fruit in one of the plurality of pockets formed between adjoining brushes will impede the rotation of both pieces of fruit in the pocket and one of the pieces of fruit will be propelled by the rotation of the brushes in a direction opposite to the direction of linear motion of the brushes. This causes fruit in excess of that necessary to fill each of the plurality of pockets between adjacent brushes with a single piece of fruit to accumulate in the feeder device until a pocket becomes available. When an empty pocket becomes available because the input of fruit to the feeder device is decreased or stopped, the excess fruit is fed one piece to a pocket to the weight sizer.

The output capacity of the feeder device disclosed herein can be varied by adjusting the speed of linear motion of the brushes or by varying the number of brushes positioned beside each other transverse to the direction of linear motion of the brushes. Varying the number of brushes in this manner varies the number of pockets simultaneously arriving at the output end of the feeder device. Increasing the length of the feeder device by increasing the number of brushes moving in sequence increases the capacity of the feeder device to accumulate fruit.

The linear motion of the pockets between adjacent brushes can be related to the motion of the cups of the weight sizer or to other apparatus utilizing the output of the feeder device using various arrangements. However, regardless of the output capacity of the feeder device or the apparatus with which it is used, the feeder device disclosed herein accumulates excess fruit and feeds fruit from its output end as single pieces as long as its capacity to accumulate fruit is not exceeded. The number of single pieces of fruit fed simultaneously is solely a function of the number of pockets which are arranged to arrive simultaneously at the output end of the feeder device.

The excess fruit is accumulated by the feeder device without the necessity for manually refeeding excess fruit to the feeder device. Moreover, means is provided by the feeder device for automatically ejecting the fruit at the output end of the feeder device.

These and other features and advantages of the invention will be more clearly understood from the following detailed description and the accompanying drawings in which like characters of reference designate corresponding parts in all figures and in which:

FIG. 4 is a fragmentary sectional view taken substantially in line 4—4 in FIG. 1.

FIG. 5 is a fragmentary sectional view of one of the plurality of brushes taken in a plane perpendicular to one of the plurality of brush shafts.

FIG. 6 is a schematic presentation of a pair of adjoining brushes and of a piece of fruit in the pocket formed between the said brushes showing the manner in which the brushes and fruit rotate as the fruit is carried by the brushes.

FIG. 7 is a schematic presentation of a pair of adjoining brushes and of two pieces of fruit in the pocket formed between the said brushes showing the manner in which the brushes rotate and in which the restricted rotation of the fruit causes one of the pieces of fruit to be ejected from the pocket between the adjoining brushes.

FIG. 8 is a schematic presentation of a pair of adjoining brushes as their direction of linear motion changes so as to cause an ejector bar to eject a piece of fruit from the pocket formed between the said adjoining brushes.

Figure 1:
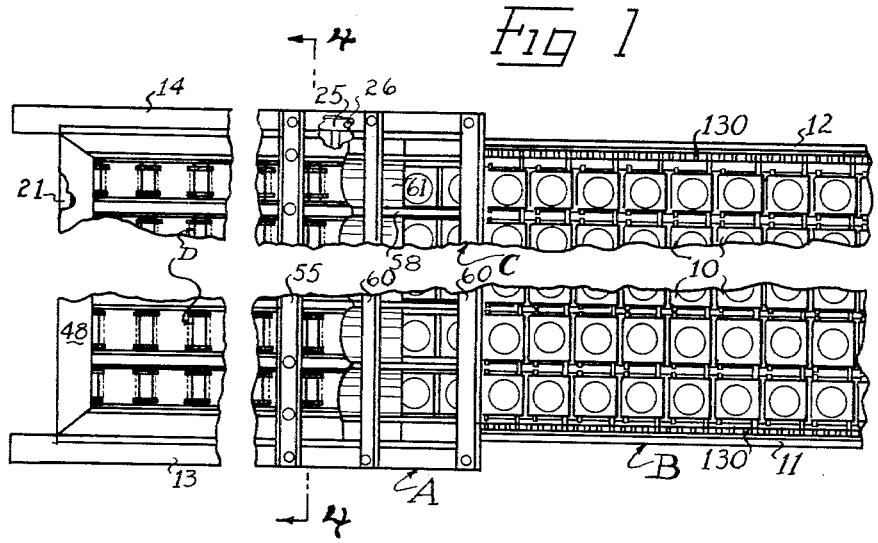
FIG. 1 is a fragmentary top plan view of the feeder device of the invention used with a weight sizer of known type.
Figure 2:
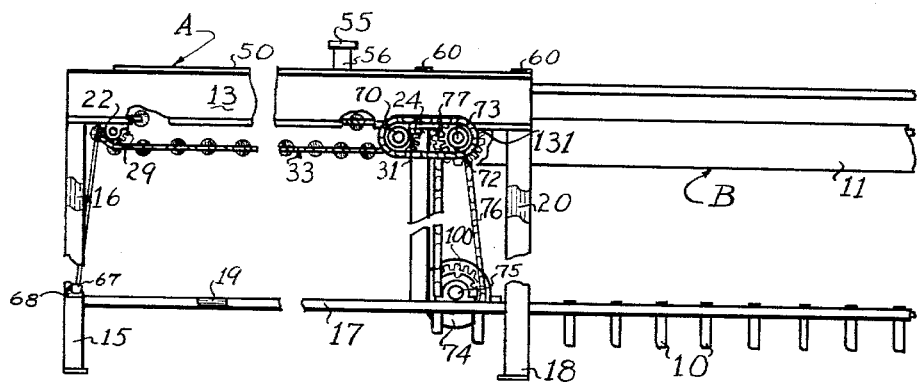
FIG. 2 is a fragmentary side elevational view of the feeder device used with a weight sizer of known type as shown in FIG. 1.

These figures and the following detailed description disclose a preferred specific embodiment of the invention but the invention is not limited to the details disclosed since it may be embodied in other equivalent forms.

In the specific embodiment of the feeder device disclosed herein, the feeder device, generally indicated by the letter A, is adapted for use with a weight sizer generally indicated by the letter B. The weight sizer B is of known type having a plurality of cups 10 carried between conveyor chains 130 on sprockets 131 and moving in sequence between a right side 11 and a left side 12. The sides 11 and 12 are parallel and the cups 10 arranged in rows extending transversely to the direction of motion of the cups 10 between the sides 11 and 12. Each row of cups 10 follows the preceding row of cups 10 as the cups 10 move between the sides 11 and 12.

The maximum utilization of the weight sizer B requires that a piece of fruit be placed in all of the cups 10 in each of the rows of cups 10 as that row of cups 10 passes a particular point in its motion between the sides 11 and 12. The point at which a piece of fruit is placed in each of the plurality of cups 10 in a row is the input point of the weight sizer B and in the specific embodiment of the invention illustrated, the input point of the weight sizer B is that end of the weight sizer B generally indicated by the letter C.

The feeder device A of the invention places a piece of fruit into each of the plurality of cups 10 in a particular row as the plurality of cups 10 in the row pass the input end C of the weight sizer B. Since the weight sizer B is of known construction and operates in known manner when a piece of fruit is placed in each of the plurality of cups 10 in a row of cups 10, the construction and operation of the weight sizer B will be understood from the foregoing brief description and the detailed description to follow will be limited to a consideration of the feeder device A of the invention.

The feeder device A has a right support member 13 fixedly attached to and extending from the right side 11 of the weight sizer B at the input end C of the weight sizer B and a left support member 14 fixedly attached to and extending from the left side 12 of the weight sizer B at the input end C of the weight sizer B. The support members 13 and 14 are parallel to each other and spaced apart and at their ends most remote from the weight sizer B they are supported by legs 15 and 16 respectively.

A right longitudinal spacer member 17 extends between the leg 15 of the feeder device A and the leg 18 of the weight sizer B which supports the right side 11 of the weight sizer B at the input end C. Similarly, a left longitudinal spacer member 19 extends between the leg 16 of the feeder device A and the leg 20 of the weight sizer B which supports the left side 12 of the weight sizer B at its input end C. A transverse spacer member 21 extends between the legs 15 and 16 and with the longitudinal spacer members 17 and 19 serves to provide a frame for supporting the support members 13 and 14 as they extend beyond the input end C of the weight sizer B.

Extending below the right support member 13 at that end supported by the leg 15 is a right idler shaft support 22 and extending below the left support member 14 at that end supported by the leg 16 is a left idler shaft support 23. Extending below the right support member 13 adjacent to the input end C of the weight sizer B is a right drive shaft support 24 and extending below the left support member 14 adjacent to the input end C of the weight sizer B is a left drive shaft support 25. The idler shaft supports 22 and 23 and the drive shaft supports 24 and 25 are attached to the support members 13 and 14 by bolts 26 in known manner.

Rotatably extending between and through the idler shaft supports 22 and 23 is an idler shaft 27 and rotatably extending between and through the drive shaft supports 24 and 25 is a drive shaft 28. The idler shaft supports 22 and 23 and the drive shaft supports 24 and 25 are positioned on the support members 13 and 14 so that the axes of rotation of the idler shaft 27 and the drive shaft 28 are parallel to each other in a horizontal plane of reference and substantially perpendicular to the support members 13 and 14 as the support members 13 and 14 extend from the input end C of the weight sizer B.

Positioned on the idler shaft 27 between the support members 13 and 14 are a right idler sprocket wheel 29 and a left idler sprocket wheel 30. The right idler sprocket wheel 29 is adjacent to the right support member 13 and the left idler sprocket wheel 30 is adjacent to the left support member 14. Similarly, positioned on the drive shaft 28 between the support members 13 and 14 are a right drive sprocket wheel 31 and a left drive sprocket wheel 32. The right drive sprocket wheel 31 is adjacent to the right support member 13 and the left drive sprocket wheel 32 is adjacent to the left support member 14.

The right idler sprocket wheel 29 and the right drive sprocket wheel 31 lie in the same vertical plane of reference substantially parallel to the right support member 13 and the left idler sprocket wheel 30 and the left drive sprocket wheel 32 lie in the same vertical plane of reference substantially parallel to the left support member 14. The sprocket wheels 29, 30, 31 and 32 are of equal diameter and a right feed chain 33 encloses and extends between the right idler sprocket wheel 29 and right drive sprocket wheel 31. Similarly, a left feed chain 34 encloses and extends between the left idler sprocket wheel 30 and the left drive sprocket wheel 32.

Figure 3:
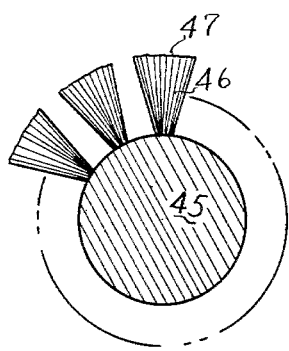
FIG. 3 is a fragmentary sectional view taken in a vertical plane passing between two guide members.

The feed chains 33 and 34 are of known type having links 35 joined by bolts 36 and rotation of the drive shaft 28 and of the drive sprocket wheels 31 and 32 in a clockwise direction as viewed in FIG. 3 causes rotation of the idler sprocket wheels 29 and 30 and linear motion of the feed chains 33 and 34 toward the input end C of the weight sizer B. However, every third bolt 36 of the right feed chain 33 is integral with a right pin 37 which extends beyond the right feed chain 33 toward the left feed chain 34. Similarly, every third bolt 36 of the left feed chain 34 is integral with a left pin 38 which extends toward the right feed chain 33.

The centerlines of the plurality of right pins 37 and the centerlines of the plurality of left pins 38 are parallel to the axes of rotation of the idler shaft 37 and the drive shaft 28 and the centerline of each right pin 37 coincides with the centerline of one of the plurality of left pins 38.

A brush shaft 39 extends between each of the plurality of right pins 37 and the left pins 38 having a coinciding centerline. The centerline of each of the plurality of brush shafts 39 is parallel to the axes of rotation of the idler shaft 27 and the drive shaft 28, and each brush shaft 39 is rotatably positioned between a right pin 37 and a left pin 38 by extending the right pin 37 into a bearing 40 fixedly positioned in a cylindrical recess 41 in the right end of the brush shaft 39 and by extending the left pin 38 into a bearing 42 fixedly positioned in a cylindrical recess 43 in the left end of the brush shaft 39. The bearings 40 and 42 are of known type and the arrangement provides a plurality of freely rotatable brush shafts 39 extending between and equally distributed along the lengths of the right feed chain 33 and the left feed chain 34.

A spacer sleeve 44 is positioned on each of the pins 37 and 38 between the feed chain 33 or 34 and the end of the brush shaft 39 into which the pin 37 or 38 is inserted. The spacer sleeves 44 serve to maintain the lateral positions of the brush shafts 39 between the feed chains 33 and 34.

Each of the plurality of brush shafts 39 has a brush sleeve 45 integral and the concentric with the greater portion of its length between the pins 37 and 38, and arranged along the length of each of the plurality of brush shafts 45 are a plurality of brushes, each brush being generally indicated by the letter D. In the specific embodiment of the invention described herein, each of the plurality brushes D comprises five rows of bristles 46 arranged adjacent and parallel to each other around the circumference of the brush shaft 39. The bristles 46 of each of the plurality of brushes D are arranged in tufts for convenience of manufacture and the bristles 46 in each row, with the bristles 46 in adjacent rows of the brush D, are sufficiently numerous and rigid to support a piece of fruit on their tips 47. However, the bristles 46 are sufficiently flexible to provide a soft surface which will not damage fruit supported by their tips 47.

The plurality of brushes D distributed along the length of each of the plurality of brush sleeves 45 are arranged so that there is a brush D preceding and a brush D following each of the plurality of brushes D as the brush shafts 39 and the feed chains 33 and 34 move continuously toward the input end C of the weight sizer B with rotation of the drive sprocket wheels 31 and 32 in a clockwise direction as viewed in FIG. 3.

The distance between the centerlines of the brush shafts 39, the diameter of each brush sleeve 45 and the diameter of each brush D from bristle tip 47 to bristle tip 47 through the centerline of a brush shaft 39 are selected so that a piece of fruit will not pass between a brush D and the brushes D preceding and following it as the brushes D move with the feed chains 33 and 34. Thus, as the brushes D move in rows and in sequence with the feeder chains 33 and 34, a plurality of pockets E are formed between adjacent brushes D. The pockets E move in rows which extend transverse to the direction of linear motion of the brushes D and in sequence in the direction of linear motion of the brushes D as the feed chains 33 and 34 move with rotation of the drive sprocket wheels 31 and 32 in a clockwise direction as viewed in FIG. 3.

Extending between the right support member 13 and the left support member 14 at that end of the support members 13 and 14 most remote from the input end C of the weight sizer B is a feed shelf 48. The feed shelf 48 is a substantially flat plate with its upper edge 49 more remote from the weight sizer B than the idler shaft 27 and in substantially the same horizontal plane of reference as the upper edges 50 and 51 of the support members 13 and 14, and with its lower edge 52 positioned immediately above the brushes D on that brush shaft 39 extending between the feed chains 33 and 34 as the feed chains 33 and 34 leave the idler sprocket wheels 29 and 30 with rotation of the drive sprocket wheels 31 and 32 in a clockwise direction as viewed in FIG. 3.

A right post 53 extends upward from the right support member 13, a left post 54 extends upward from the left support member 14, and a transverse rod 55 extends between extending ends of the right post 53 and the left post 54. Extending downward from the transverse rod 55 between the posts 53 and 54 are a plurality of support posts 56. A guide member 57 is fixedly attached to the lower end of each of the plurality of support posts 56. Each of the plurality of guide members 57 extends between and parallel to the support members 13 and 14 from a support post 56 to the lower edge 52 of the feed shelf 48 and in the opposite direction from the support post 56 to the input end C of the weight sizer B. At the input end C of the weight sizer B, each of a plurality of guide members 57 is integral with a divider 58 which extends over the input end C of the weight sizer B between adjacent cups 10.

The guide members 57 are positioned between adjacent brushes D on the plurality of brush sleeves 45 and have flanges 59 extending downward so as to place the bristles 46 of each of the plurality of brushes D between parallel flanges 59. As a result, the guide members 57 form channels F in which the plurality of brushes D move in sequence as the feed chains 33 and 34 move toward the input end C of the weight sizer B with the drive sprocket wheels 31 and 32 rotating in a clockwise manner as viewed in FIG. 3. The width of the channels F is sufficient for one piece but not for two pieces of fruit to be positioned on the brushes D between guide members 57 without engaging the guide members 57. The dividers 58 serve to extend the channels F out over the cups 10 of the weight sizer B.

The dividers 58 are maintained in position by the guide members 57 and by straps 60 extending from the right side 11 to the left side 12 of the weight sizer B. The transverse rod 55 is positioned a sufficient distance above the brushes D to permit fruit in a pocket E to pass beneath the transverse rod 55 and the straps 60 are a sufficient distance above the cups 10 to permit fruit in the cups 10 to pass beneath the straps 60.

A discharge chute 61 is positioned between adjacent dividers 58 where the dividers 58 are integral with the guide members 57. Each discharge chute 61 is curved and positioned to form a surface extending from adjacent to a brush D to a position immediately above a cup 10 between adjacent dividers 58.

A brush sprocket wheel 62 is fixedly mounted on each of the plurality of brush shafts 39 between the right pin 37 and the brush sleeve 45. The plurality of brush sprocket wheels 62 all lie in the same vertical plane of reference and are enclosed within a brush chain 63 having one of its links 64 fixedly attached to one end 65 of a chain rod 66. The second end 67 of the chain rod 66 is pivotally attached to a bracket 68 fixedly mounted on the transverse spacer member 21. The attachment of a link 64 of the brush chain 63 to the chain rod 66 restricts motion of the brush chain 63 and as a result, the brush chain 63 serves as a track along which the brush sprocket wheels 62 move in a rotating manner as the brush shafts 39 are carried in a linear manner between the right support member 13 and the left support member 14 with motion of the feed chains 33 and 34. A chain hold down 120 positioned on a guide member 57 above the brush chain 63 holds the brush chain 63 downward on the brush sprocket wheels 62 and insures that the brush sprocket wheels 62 engage the brush chain 63 in a uniform manner.

The linear motion of the brush shafts 39 with respect to the brush chain 63 causes rotation of the brush sprocket wheels 62 and of the brushes D. When the plurality of brushes D move from the idler sprocket wheels 29 and 30 toward the drive sprocket wheels 31 and 32 with rotation of the drive sprocket wheels 31 and 32 in a clockwise direction as viewed in FIG. 3, the rotation of a brush sprocket wheel 62 and of the plurality of brushes D resulting from the engagement of the brush chain 63 by the brush sprocket wheel 62 in a counter clockwise direction as viewed in FIG. 3. Moreover, the diameter of the brush sprocket wheels 62 and the diameter of the brushes D are selected so that the tangential speed of the brushes D as they rotate is greater than the tangential speed of the sprocket wheels 62. Since the tangential speed of the sprocket wheels 62 is the linear speed of the brushes D, the result is that the linear speed of the brushes D between the support members 13 and 14 is less than the tangential speed of the brushes D as they rotate.

That end of the drive shaft 28 extending between the right drive shaft support 24 carries a power sprocket wheel 70. The power sprocket wheel 70 is connected in known manner by a link chain 71 to an intermediate sprocket wheel 72 carried by the drive axle 73 of the weight sizer B. The drive axle 73 of the weight sizer B is driven by a motor 74 having a motor sprocket wheel 100 on its motor axle 75 connected by a chain belt 76 to an input sprocket wheel 77 also mounted on the drive axle 73.

The motor 74 is an electrical motor of known type and operation of the motor 74 in the customary well-understood manner rotates the drive axle 73 and the drive shaft 28. Rotation of the drive axle 73 moves the cups 10 in known manner and causes motion of the cups 10 beneath the chutes 61. Rotation of the drive shaft 28 in a clockwise direction as viewed in FIGURE 3 causes the plurality of brushes D and the pockets F between the plurality of brushes D to move toward the chutes 61.

Fixedly attached to a link 35 of the right feed chain 33 adjacent to each right pin 37 is a right ejector support 80, and fixedly attached to a link 35 of the left feed chain 34 adjacent to each left pin 38 is a left ejector support 81. The ejector supports 80 and 81 extend outwardly of and parallel to the feed chains 33 and 34 in a direction opposite to the direction of motion of the feed chains 33 and 34 when the drive sprocket wheels 31 and 32 rotate in a clockwise direction as viewed in FIG. 3.

An ejector rod 84 extends between the extending end of each of the plurality of right ejector supports 80 and the extending end of one of the plurality of left ejector supports 81. The length of the right ejector supports 80 and the length of the left ejector supports 81 are equal and are selected so as to place an ejector rod 84 in the pockets E between each of the transverse rows of brushes D.

As the brushes D move in a substantially horizontal plane of reference from the feed shelf 48 to a chute 61, the ejector rods 84 are above the feed chains 33 and 34 and move beneath the flanges 59 of the guide members 57. During this motion of the brushes D, the ejector rods 84 are adjacent to the feed chains 33 and 34 and relatively deep in the pockets E. In this position, the ejector rods 84 insure that fruit does not fall between brushes D. However, when the links 35 carrying a right ejector support 80 and a corresponding left ejector support 81 start rotating on the drive sprocket wheels 31 and 32 downward away from the chutes 61, the backward extension of the ejector supports 80 and 81, relative to the motion of feed chains 33 and 34, causes the ejector rod 84 joining these particular ejector supports 80 and 81 to move upward in the pockets E through which it extends. This is best shown in FIGS. 3 and 9.

A right shield 85 extends downward from the upper edge of 50 of the right support member 13 to the guide member 57 adjacent to the right support 13 and a left shield 86 extends downward from the upper edge 51 of the left support member 14 to the guide member 57 adjacent the left support member 14. The shields 85 and 86 with the feed shelf 48 keep fruit within the area defined by them and adjacent to and above the channels F.

*Operation*

Fruit 119 to be arranged and fed in an orderly and controlled manner by the feeder device A is placed on the feed shelf 48 by hand or by a mechanical arrangement (not shown) such as an endless conveyor belt or a plurality of rollers. Regardless of how the fruit 119 is placed on the feed shelf 48, the pieces of fruit 119 roll down the inclined surface of the feed shelf 48 and accumulate in the channels F and on the guide members 57 adjacent to the lower edge 52 of the feed shelf 48.

With the drive sprocket wheels 31 and 32 rotating in a clockwise direction as viewed in FIGURE 3, a plurality of brushes D are moving in the channels F from the lower edge 52 of the feed shelf 48 toward the chutes 61 and some of the pieces of fruit 119 rolling down the feed shelf 48 into the channels F are positioned in the pockets E formed between adjacent brushes D in the channels F, and some of the pieces of fruit 119 are on top of the pieces of fruit 119 in the pockets E. As the pockets E move in the channels F toward the chutes 61, the rotation of the brush D surfaces on which the pieces of fruit 119 rest in the pockets E causes a plurality of pieces of fruit 119 in a pocket E to move toward the feed shelf 48 in a direction opposite to the direction of motion of the brushes D toward the chutes 61 as shown schematically in FIGURE 7. This is because the friction between pieces of fruit 119 restricts their rotation with the brushes D.

This backward motion of pieces of fruit 119 in a pocket E continues until only a single piece of fruit 119 remains in a pocket E. When only a single piece of fruit 119 remains in a pocket E, the single piece of fruit 119 rotates with the brushes D and remains in the pocket E as shown in FIGURE 6 as the pocket E moves toward a chute 61.

As a pocket E carrying a single piece of fruit 119 approaches a chute 61, the feed chains 33 and 34 start to move downward on the drive sprocket wheels 31 and 32 and an ejector rod 84 moves upward in the pocket E as shown in FIGURE 8 to force the piece of fruit 119 upward in the pocket E. This upward motion of the piece of fruit 119 in a pocket E and the continuing motion of the pocket E causes the piece of fruit 119 to enter a chute 61. Once in a chute 61, a piece of fruit 119 rolls to a cup 10 of the weight sizer B. Since the feeder device A and the weight sizer B are driven from a common drive axle 73, the motion of the pockets E and of the cups 10 can be related in known manner to cause a piece of fruit 119 to drop from a chute 61 when a cup 10 is properly positioned beneath the chute 61. Other arrangements can be used to relate the motion of the pockets E to the motion of the cups 10 or to other apparatus.

Those pieces of fruit 119 which are forced by the rotation of the brushes D toward the feed shelf 48 continue to move in this direction until they become the only piece of fruit 119 in a pocket E. Thus, the rotational motion of the brushes D causes fruit 119 to accumulate and permits only a single piece of fruit 119 to move in a pocket E to a chute 61. Pieces of fruit 119 rolling down the feed shelf 48 and landing on a guide member 57 roll from the guide member 57 into a channel F when space becomes available in the channel F. Similarly, the shields 85 and 86 cause pieces of fruit 119 engaging them to fall into channels F when space becomes available in the channels F.

The support posts extending above the guide members 57 between the feed shelf 48 and the chutes 61 insure that pieces of fruit 119 will not roll down the guide members 57 to the weight sizer B. Thus, pieces of fruit 119 can reach the chutes 61 only in the channels F where the brushes D restrict the fruit 119 reaching the chutes 61 to a single piece of fruit 119 in each pocket E. Excess fruit 119 is accumulated to be fed when the input to the feeder device A decreases or stops. However, the excess fruit 119 is not damaged and will be fed from the chutes 61 without attention from the operator of the feeder device A.

It will be obvious that many variations may be made in the embodiment here chosen for the purpose of illustrating the present invention without departing from the scope thereof as defined by the appended claims.

What is claimed as invention is:

1. A feeder device for feeding randomly arranged fruit one piece at a time to a weight sizer having a plurality of cups moving from its input end to its output end, said feeder device comprising, in combination, a first support member positioned adjacent to the input end of the weight sizer; a second support member extending from the input end of the weight sizer parallel to and spaced apart from the first support member; a first shaft rotatably positioned between the first support member and the second support member adjacent to the input end of the weight sizer; a second shaft rotatably positioned between the first support member and the second support member move remote from the input end of the weight sizer than the first shaft; a first sprocket wheel fixedly positioned on the first shaft adjacent to the first support member; a second sprocket wheel fixedly positioned on the first shaft adjacent to the second support member; a third sprocket wheel fixedly positioned on the second shaft adjacent to the first support member; a fourth sprocket wheel fixedly positioned on the second shaft adjacent to the second support member; a first feed chain enclosing and extending between the first sprocket wheel and the third sprocket wheel; a second feed chain enclosing and extending between the second sprocket wheel and the fourth sprocket wheel; a plurality of brush shafts rotatably extending between and movable with the first feed chain and the second feed chain; a plurality of brush sprocket wheels, each brush sprocket wheel fixedly mounted on one of the plurality of brush shafts; a plurality of guide members extending parallel to each other and forming a plurality of channels between and parallel to the said support members above the plurality of brush shafts; a plurality of brushes arranged along the length of each brush shaft and with a brush on each brush shaft in each of the plurality of channels formed between the said guide members, said brushes having bristles sufficiently long and rigid to prevent a piece of fruit from passing between brushes adjacent to each other in a channel; power means for rotating the first and second shafts in that rotational direction which moves the brush shafts immediately beneath the guide members toward the input end of the weight sizer; means for rotating the brushes moving in the plurality of channels toward the input end of the weight sizer in that rotational direction which has a component of motion in a channel which is opposite to and greater than the linear motion of the brushes toward the input end of the weight sizer; and means for ejecting a piece of fruit from between adjacent brushes in a channel into one of the plurality of cups.

2. A feeder device for feeding randomly arranged fruit as single pieces to a weight sizer, said weight sizer having a plurality of cups in which single pieces of fruit are placed and feed means for moving the plurality of cups along a predetermined path and said feeder device comprising, in combination, a frame; a right support member mounted on said frame; a left support member mounted on said frame and extending parallel to and spaced apart from the right support member; an idler shaft rotatably positioned with its axis of rotation extending between the right support member and the left support member; a drive shaft rotatably positioned between the right support member and the left support member with its axis of rotation parallel to the axis of rotation of the idler shaft; a right idler sprocket wheel fixedly positioned on the idler shaft adjacent to the right support member; a left idler sprocket wheel fixedly positioned on the idler shaft adjacent to the left support member; a right drive sprocket wheel fixedly positioned on the drive shaft adjacent to the right support member; a left drive sprocket wheel fixedly positioned on the drive shaft adacent to the left support member; a right feed chain enclosing and extending between the right idler sprocket wheel and the right drive sprocket wheel; a left feed chain enclosing and extending between the left idler sprocket wheel and the left drive sprocket wheel; a plurality of brush shafts rotatably extending between and movable with the right feed chain and the left feed chain, said brush shaft having their axes of rotation parallel to each other and to the axes of rotation of the idler shaft and of the drive shaft; a plurality of brush sprocket wheels, each brush sprocket wheel being fixedly mounted on one of the plurality of brush shafts; a brush chain engaging and enclosing the plurality of brush sprocket wheels; a plurality of guide members extending parallel to each other and forming a plurality of channels between and parallel to the said support members above the plurality of brush shafts; a plurality of bristles extending radially from the plurality of brush shafts, said bristles being arranged on each brush shaft to form a plurality of brushes along the length of each brush shaft and a brush on each brush shaft in each of the plurality of channels formed between the said guide members, and said bristles being sufficiently long and rigid to prevent a piece of fruit from passing between brushes adjacent to each other in a channel; a plurality of chutes, each chute having one end in one of the plurality of channels substantially adjacent to a brush shaft over the drive axle and its other end over one of the plurality of cups of the weight sizer; power means for rotating the drive shaft in that rotational direction which moves the brush shafts immediately beneath the guide members from the idler sprocket wheels toward the drive sprocket wheels and the plurality of chutes; a plurality of right ejector supports extending from the right feed chain in a direction opposite to the direction of motion of the right feed chain in response to the power means; a plurality of left ejector supports extending from the left feed chain in a direction opposite to the direction of motion of the left feed chain in response to the power means; a plurality of ejector rods, each ejector rod extending between the extending end of one of the plurality of right ejector supports and the extending end of one of the plurality of left ejector supports, each ejector rod slidably moving between the guide members and the said feed chains, and each ejector rod being between the bristles of brushes adjacent to each other in a channel, the arrangement of the ejector rods and the right and left ejector supports being such that an ejector rod ejects a piece of fruit from between adjacent brushes into one of the plurality of chutes; means for restricting the motion of the brush chain, said restricting means cooperating with the brush chain to cause a rotational motion of the brush sprocket wheels and the brushes as they move with linear motion of the feed chains which has a tangential component within a channel opposite to and greater than linear motion of the brush shafts beneath the guide members; and means for relating the linear motion of the brush shafts in response to the power means to the feed means of the weight sizer so that a cup is beneath a chute when a piece of fruit ejected by an ejector rod is at that end of the chute above the cup.

3. A feeder device for feeding articles as rows of single articles, said feeder device comprising, in combination, a frame; a right support member mounted on said frame; a left support member mounted on said frame and extending horizontally parallel to and spaced apart from the right support member; an idler shaft rotatably positioned with its axis of rotation extending between the right support member and the left support member; a drive shaft rotatably positioned between the right support member and the left support member with its axis of rotation parallel to the axis of rotation of the idler shaft in a horizontal plane of reference; a right idler sprocket wheel fixedly positioned on the idler shaft adjacent to the right support member; a left idler sprocket wheel fixedly positioned on the idler shaft adjacent to the left support member; a right drive sprocket wheel fixedly positioned on the drive shaft adjacent to the right support member; a lift drive sprocket wheel fixedly positioned on the drive shaft adjacent to the left support member; a right feed chain enclosing and extending between the right idler sprocket wheel and the right drive sprocket wheel; a left feed chain enclosing and extending between the left idler sprocket wheel and the left drive sprocket wheel; a plurality of brush shafts rotatably extending between and movable with the right feed chain and the left feed chain, said brush shafts having in their axes of rotation parallel to each other and to the axes of rotation of the idler shaft and of the drive shaft; a plurality of brush sprocket wheels, each brush sprocket wheel being fixedly mounted on one of the plurality of brush shafts adjacent to the right feed chain; a brush chain engaging and enclosing the plurality of brush sprocket wheels; a plurality of guide members extending parallel to each other between and parallel to the said support members, said guide members forming a plurality of channels above the plurality of brush shafts; a plurality of bristles extending radially from the plurality of brush shafts, said bristles being arranged on each brush shaft to form a plurality of brushes along the length of each brush shaft and a brush on each brush shaft in each of the plurality of channels formed between the said guide members, and said bristles being sufficiently long and rigid to prevent one of the said articles from passing between brushes adjacent to each other in a channel; power means for rotating the drive shaft in that rotational direction which moves the brush shafts immediately beneath the guide members from the idler sprocket wheels toward the drive sprocket wheels; a plurality of right ejector supports extending from the right feed chain in a direction opposite to the direction of motion of the right feed chain in response to the power means; a plurality of left ejector supports extending from the left feed chain in direction opposite to the direction of motion of the left feed chain in response to the power means; a plurality of ejector rods, each ejector rod extending between the extending end of one of the plurality of right ejector supports and the extending end of one of the plurality of left ejector supports, each ejector rod slidably moving between the guide members and the said feed chains, and each ejector rod being between the bristles of brushes adjacent to each other in a channel; and means for restricting the motion of the brush chain, said restricting means cooperating with the brush chain to cause a rotational motion of the brush sprocket wheels and the brushes as they move with linear motion of the feed chains which has a tangential component within a channel opposite to and greater than the linear motion of the brush shafts beneath the guide members.

4. A feeder device for feeding randomly arranged articles one at a time, said feeder device comprising, in combination, a frame; a right support member mounted on said frame; a left support member mounted on said frame and extending parallel to and spaced apart from the right support member; an idler shaft rotatably positioned with its axis of rotation extending between the right support member and the left support member; a drive shaft rotatably positioned between the right support member and the left support member with its axis of rotation parallel to the axis of rotation of the idler shaft; a right idler sprocket wheel fixedly positioned on the idler shaft adjacent to the right support member; a left idler sprocket wheel fixedly positioned on the idler shaft adjacent to the left support member; a right drive sprocket wheel fixedly positioned on the drive shaft adjacent to the right support member; a left drive sprocket wheel fixedly positioned on the drive shaft adjacent to the left support member; a right feed chain enclosing and extending between the right idler sprocket wheel and the right drive sprocket wheel; a left feed chain enclosing and extending between the left idler sprocket wheel and the left drive sprocket wheel; a plurality of brush shafts rotatably extending between and movable with the right feed chain and the left feed chain, said brush shafts having their axes of rotation parallel to each other and to the axes of rotation of the idler shaft and of the drive shaft; a plurality of brush sprocket wheels, each brush sprocket wheel being fixedly mounted on one of the plurality of brush shafts; a brush chain engaging and enclosing the plurality of brush sprocket wheels; a plurality of guide members extending parallel to each other and forming a channel parallel to the said support members above the plurality of brush shafts; a plurality of bristles extending radially from the plurality of brush shafts, said bristles being arranged to form a brush on each brush shaft in the channel formed between the said guide members, and said bristles being sufficiently long and rigid to prevent one of the said articles from passing between brushes adjacent to each other in the channel; power means for rotating the drive shaft in that rotational direction which moves the brush shafts immediately beneath the guide members from the idler sprocket wheels toward the drive sprocket wheels; a plurality of right ejector supports extending from the right feed chain in a direction opposite to the direction of motion of the right feed chain in response to the power means; a plurality of left ejector supports extending from the left feed chain in a direction opposite to the direction of motion of the left feed chain in response to the power means; a plurality of ejector rods, each ejector rod extending between the extending end of one of the plurality of right ejector supports and the extending end of one of the plurality of left ejector supports, each ejector rod slidably moving between the guide members and the said feed chains, and each ejector rod being between the bristles of brushes adjacent to each other in the channel; and means for restricting the motion of the brush chain, said restricting means cooperating with the brush chain to cause a rotational motion of the brush sprocket wheels and the brushes as they move with linear motion of the feed chains which has a tangential component within the channel opposite to and greater than linear motion of the brush shafts beneath the guide members.

5. A feeder device for feeding fruit individually to each of one of a plurality of cups at the input end of a weight sizer, said feeder device comprising, in combination, a frame positioned adjacent to the input end of the weight sizer; a plurality of brushes moving in sequence on the said frame toward the input end of the weight sizer, each of the plurality of brushes forming a pocket with the brush preceding it and the brush following it toward the input end of the weight sizer; means for rotating the plurality of brushes in a rotational direction which gives that surface of each brush forming a pocket with an adjacent brush a tangential component of motion opposite to and greater than the linear motion of the brush toward the input end of the weight sizer; input means for placing fruit on the plurality of brushes remote from the input end of the weight sizer; and ejector means for ejecting a piece of fruit from a pocket between adjacent brushes and into one of the plurality of cups of the weight sizer.

6. A feeder device for feeding randomly arranged spherical articles one article at a time, said feeder device comprising, in combination, an input end constructed to receive randomly arranged articles; an output end from which the articles are fed one article at a time; a plurality of cylindrical rollers moving in a linear manner from the input end to the output end, each of said rollers being sufficiently close to the roller preceding it and the roller following it toward the said output end to form pockets between adjacent rollers for receiving spherical articles and each of said rollers being continuously rotated about an axis of rotation perpendicular to its direction of linear motion at a rotational speed which gives it a tangential component of rotational motion opposite to and greater than its linear motion toward the said output end; and means for ejecting a spherical article from one of the plurality of pockets at the said output end.

7. A feeder device for feeding randomly arranged fruit one piece of fruit at a time to each of a plurality of cups of a weight sizer, said weight sizer having an input point at which fruit is placed in the plurality of cups as the cups move with reference to the input point and said feeder device comprising, in combination, an output end positioned adjacent to the input point of the weight sizer; an input end positioned remote from the input point of the weight sizer and having means for receiving the randomly arranged fruit; a plurality of cylindrical rollers moving in a linear manner from the said input end to the said output end, each of said rollers forming a pocket between its cylindrical surface and the cylindrical surface of the roller preceding it and the roller following it toward the output end which is sufficiently large to receive a piece of fruit, means for rotating said rollers about an axis of rotation perpendicular to its direction of linear motion at a rotational speed constantly proportional to the linear speed of said rollers and which gives the rollers' cylindrical surface a tangential component of rotational motion opposite to and greater than the linear motion of the said roller toward the said output end; and means for ejecting a piece of fruit from one of the plurality of pockets into one of the plurality of cups as the cup moves with reference to the input point of the weight sizer.

8. In a feeder device for feeding one piece of fruit at a time to a cup of a weight sizer, said feeder device comprising, in combination, an output end to be positioned adjacent to the input point of the weight sizer; an input end having means for receiving randomly arranged fruit; a plurality of rollers moving from said input end to said output end, each of said rollers forming a pocket with the roller preceding it and the roller following it toward the output end, and each of said rollers being rotated throughout its movement from said input end toward said output end at an angular velocity which gives its surface a tangential component of velocity opposite to and greater than the velocity of said roller toward the said output end; and each of said rollers having means for ejecting a piece of fruit from each of the plurality of pockets into a cup of the weight sizer.

9. A feeder device for feeding spherical articles one article at a time, said feeder device comprising, in combination, an input end into which the articles are randomly placed; an output end from which the articles are fed one article at a time; a plurality of rollers moving from the input end to the output end, each of said rollers forming a pocket with the roller preceding it and the roller following it toward said output end and each of said rollers being rotated substantially throughout its entire motion from said input end to said output end at an angular velocity which gives it a tangential component of velocity opposite to and greater than its velocity toward said output end; and means for ejecting a spherical article from each one of the plurality of pockets at the said outut end.

10. A feeder device for individually feeding spherical articles, said feeder device comprising, in combination, an input end into which the articles are randomly placed; an output end from which the articles are individually fed; a plurality of rollers moving from the input end to the output end, each of said rollers forming a pocket with the roller preceding it and the roller following it toward said output end and each of said rollers being rotated throughout its movement from said input end toward said output end at an angular velocity which gives it a tangential component of velocity opposite to and greater than its velocity toward the said output end; and means for ejecting a spherical article from one of the plurality of pockets at the said output end.

11. A feeder device for individually feeding spherical articles, said feeder device comprising, in combination, an input end into which the articles are randomly placed; an output end from which the articles are individually fed; and a plurality of rollers moving from the input end to the output end, each of said rollers forming a pocket with the roller preceding it and the roller following it toward the said output end and each of said rollers being rotated at a rotational velocity constantly proportional to its linear velocity toward said output end which gives it a tangential component of rotational velocity opposite to and greater than its linear velocity toward the said output end.

12. A feeder device for feeding a plurality of articles one article at a time, said feeder device comprising, in combination, a frame; a plurality of brushes moving with linear motion in sequence on the said frame, each of the plurality of brushes forming a pocket with the brush preceding it and each of said pockets being sufficiently large to receive within it only one article; means for rotating the plurality of brushes in a rotational direction which gives that surface of each brush forming a pocket a tangential component of motion opposite to and greater than the linear motion of the brush; input means for placing said articles on the plurality of brushes; and each brush having ejector means for ejecting an article from a pocket.

13. A feeder device for feeding a plurality of articles one article at a time, said feeder device comprising, in combination, a frame; a plurality of brushes moving with linear motion in sequence on the said frame, each of the plurality of brushes forming a pocket with the brush preceding it and each of said pockets being sufficiently large to receive within it only one article; and means for rotating the plurality of brushes in a rotational direction which gives that surface of each brush forming a pocket a tangential component of motion opposite to, greater than and continuously proportional to the linear motion of the brush.

References Cited by the Examiner
UNITED STATES PATENTS

| | | | |
|---|---|---|---|
| 2,267,641 | 12/1941 | Chater | 15—3.17 |
| 2,531,292 | 11/1950 | Page | 198—30 |
| 2,711,813 | 6/1955 | Jordan | 198—30 |
| 2,827,089 | 3/1958 | Amori | 198—33.1 X |
| 2,830,531 | 4/1958 | Tarlton | 198—33.1 X |
| 2,961,087 | 11/1960 | Reading | 198—33.1 |

MARVIN A. CHAMPION, *Primary Examiner.*

HUGO O. SCHULZ, *Examiner.*